United States Patent Office 3,783,023

Patented Jan. 1, 1974

3,783,023

METHOD OF MAKING A COATED TAPE, AND PARTICULARLY SMOOTH SURFACE MAGNETIC RECORDING TAPE

Gordon P. Hungerford, Palmyra, N.Y., assignor to Mobil Oil Corporation

No Drawing. Continuation-in-part of abandoned application Ser. No. 30,575, Apr. 21, 1970. This application June 8, 1972, Ser. No. 260,874

Int. Cl. H01f *10/00*

U.S. Cl. 117—237 17 Claims

ABSTRACT OF THE DISCLOSURE

To improve the smoothness of the surface of coated tape, particularly coated magnetic recording tape, a thin film (e.g., 0.02 mm. thick) of polyethylene is applied on top of the wet coating of magnetic particles (e.g., iron oxide particles), in a binder, and solvent, the solvent evaporating through the polyethylene film. When the solvent has evaporated, or almost so, the polyethylene film is stripped off the coating, leaving a smooth glossy surface having improved abrasion resistance and reproduction characteristics. Typical drying conditions are about 21° C., and 45 minutes; the coating may be briefly predried but only for so long that the polyethylene film can still mold the surface of the coating to be flat during the drying process.

CROSS REFERENCE TO RELATED APPLICATIONS

This application is a continuation-in-part of copending application, Ser. No. 30,575, filed Apr. 21, 1970, and now abandoned, entitled Method of Making a Coated Tape, and Particularly Smooth Surface Magnetic Recording Tape.

FIELD OF THE INVENTION

The present invention relates to a method of manufacturing coated tape which has a smooth, glossy surface so that it will readily slide over supports, and more particularly to magnetic recording tape of improved surface characteristics so that wear on the tape, and on electromagnetic transducer heads is avoided, while having improved recording characteristics, particularly when used to record computer data.

BACKGROUND OF THE INVENTION

High quality magnetic recording tape must have a surface which is free from protuberances, since any unevenness of the surface will lift the tape away from the transducer heads, causing variations in the signal strength appearing upon playback. When magnetic recording tape having such protuberances is used in computer apparatus, bits of information recorded on the tape in the vicinity of a protuberance may be lost, since the protuberance may momentarily reduce the signal level below the recognizable level. Upon recording, insufficient magnetization of the tape may already have resulted which, when reproduced at the decreased level due to lifting off of the tape from the transducer head, may cause complete loss of the signal. Such loss in data information is called a drop out. Tape having drop outs cannot be used for commercial computers and specifications usually call for computer tape to be one hundred percent free of drop outs. Tape which is not perfect is costly to use in computer applications.

The surface condition of the tape greatly affects the reliability of the equipment, since tape which is not entirely smooth causes excessive wear of the tape transducer heads. For example, iron oxide particles coatings on the tape are ordinarily highly abrasive. It is thus desirable to provide the coated side of the tape with a surface which is as smooth as possible; this also tends to increase the high frequency response of the tape.

Recording through the tape substrate, or base, which, for high quality use usually is a polyester material, such as "Mylar," requires high signal strength, and decreases the packing density of binary information. This system is thus not used to a great extent.

It is difficult, in commercial practice, to achieve complete absence of drop outs since many sources of protuberances exist, all of which are difficult to eliminate. For example, the iron oxide as received may contain particles which are harder than the rest and which may survive even the extended wet milling process used to grind the iron particles to fine size. The very finely ground well dispersed magnetic iron oxide particles may spontaneously agglomerate and thus protrude from the wet coated surface. Foreign dust particles may embed themselves in the wet coating before the drying is completed.

The coating to be applied to the substrate must necessarily contain a very high concentration of magnetic particels (e.g., oxide) with little binder material in order to provide the necessary sensitivity and output. Upon drying of such a coating, the surface will not be perfectly smooth and glossy but rather will form a dull or flat surface. This roughness is evidenced by a dull appearance of the coated tape. Even extreme measures to decrease protuberances cannot completely eliminate drop outs, even if considerable expense is incurred during manufacture of the tape, for example by very long milling of the coating compositions (for example from 60 to 150 hours) and by practicing "white room" cleanliness. The general smoothness of the tape can be improved by hot calendaring between polished smooth steel rolls. While such treatment improves the smoothness, the resulting tapes still feel and sound rough when rubbed together and have a dull flat finish.

It is an object of the present invention to provide a method to make coated tape, and more particularly magnetic recording tape which is free of protuberances causing drop outs, and which is simple and of low cost.

SUBJECT MATTER OF THE PRESENT INVENTION

Briefly, to obtain a smooth surface, a base or substrate, for example of polyester film such as "Mylar" has a wet dispersion of finely ground particles in a binder, and a solvent applied thereto. For recording tape, these particles will be extremely finely milled particles of magnetic material (e.g., iron oxide). The wet dispersion is applied as a coating to the base or substrate. It may be permitted to pre-dry for a short period of time. Before sufficient solvent has evaporated, however, to render the coating non-deformable, a thin covering film is applied over the still wet dispersion. This thin covering film, preferably of polyethylene, should be of such material that the solvent can evaporate therethrough. It is stripped off when the solvent has evaporated, or almost so. The thin film will mold the coating. When stripped off, it will strip cleanly without pulling any coating with it or otherwise disrupting the surface which can be completely dried thereafter and the coated tape wound up. The coating film itself may be discarded or, if perfectly clean and free from wrinkles, reused.

In conventional coating practice, the coating may be applied to a substrate such as polyester film and dried by hot air, with the interface between air and the wet coating quite free. Under these circumstances, particles of a size of 0.01 mm., for example, which may be present in the coating material, will be initially visually undetectable since the thickness of the wet coating itself will be in the order of 0.05 mm. As drying proceeds, other coating material which was above and below this 0.01 mm. particle as initially deposited would stay approximately in the same relative position as it dries. The total coating thickness at that point then will be the 0.01 mm. dimension of the large particle in addition to the dry thickness of the other material, or almost 0.02 mm. This is almost 0.01 mm. thicker than it ought to be. This figure is far more than is minimally required to cause a drop out. Other particles of lesser size would result in protuberances of lesser extent while particles of larger size would result in still larger protuberances.

The method in accordance with the present invention prevents particles or agglomerates, if they are of a size below the typical dry coating thickness, for example, 0.01 mm. from protruding from the surface of the finished tape. The substrate, typically Mylar tape, is coated in a conventional manner with the desired dispersion of magnetic particles in a resinous organic solution. Part of the solvent may then be evaporated, and the conventional electromagnetic orientation of the particles performed. When a certain degree of dryness has been reached, which can readily be determined experimentally, a thin flexible plastic film which rejects the coating substance, that is, which is non-adhesive with respect thereto, and having high permeability to the evaporating solvents is then carefully laid down on the still wet coating in such a manner that no air is trapped under the film. The film, as applied, should not have wrinkles and should not substantially disturb the still wet coating. The wet coating material will wet the plastic film but not adhere thereto, if the film is adhesive. The waxy nature of polyethylene, which prevents adhesion to most substances, is particularly suitable and, in practice, it has been found that particles of, for example, iron oxide, do not adhere to the polyethylene film. The composite, substrate, wet coating, and overlayer film is then dried to a certain stage of dryness by evaporation of the solvent through the overlayer film. When the coating is sufficiently dry so that it will not deform any longer, the overlayer film is peeled off the coating. It will strip perfectly cleanly, without pulling any coating with it or otherwise disrupting the surface of the coating. Drying is then completed and the coated film can be wound on reels. It has been found that in this process, the surface of the magnetic material coating will be molded to be flat and smooth. The probability of drop outs in the finished tape is greatly decreased, not only by pushing potential protuberances down but by shielding the wet surface of the coating from contact with stray dust particles during the critical time when the coating is wet and receptive to contaminants. The surface appearance of the dried coating will be shiny. The gloss, where the polyethylene film has been in contact with it, is quite noticeable, while an uncovered test sample, having dried in free air, will feel rough and have a dull appearance.

Examples of magnetic materials, useful in the form of powders in practice of the process hereof, are disclosed in an article by C. D. Mee on pp. 399–408 of the July 1964 issue of Magnetic Tape Recording Materials. Such materials include metals such as iron, cobalt and nickel, oxides such as gamma ferric oxide, chromium dioxide, cobalt-iron oxide, barium-iron oxide, alloys such as those of iron-cobalt-nickel, iron-cobalt and others including barium ferrite, lead ferrite, manganese ferrite and nickel ferrite.

Many different types of coatings on different substrata and using different materials may be used—see, for example, U.S. Pats. 2,799,609 and 3,117,065. As an example:

A coating formulation was prepared containing 75% by dry weight of iron oxide ($Fe_2O_3$) and 25%, on a dry basis, of a binder consisting of equal parts of polyurethane elastomer (Firestone 5702–1) and a phenoxy resin (Union Carbide PXRD 2136). The formulation was ball milled for about 70 hours with a solvent mixture containing methyl ethyl ketone (MEK); methyl isobutyl ketone (MIBK); toluene; and n-butanol to form a dispersion. The dispersion of iron oxide and binder in the solvent was cast on a Mylar polyester web which had previously been treated by a corona discharge. The thickness of the wet coating was about 0.05 mm. The coating was permitted to pre-dry at ambient temperature in room air for about 30 seconds. Then a thin film of low density polyethylene of about 0.02 mm. thickness was laid down on the wet coating of the Mylar film. The coated, covered Mylar was permitted to dry for about 45 minutes at ambient room temperature, that is at approximately 21° C., without any particular air movement. The polyethylene film was then stripped off. The coating was not damaged by the removal of the polyethylene film, but adhered to the Mylar. The appearance of the surface of the coating was dark, very smooth, and glossy.

The process conditions above described are not critical. For example, drying at higher temperatures, or with air circulation would greatly reduce drying time. The coated substrate may be pre-dried for a longer period, particularly if difficulty is experienced in laying down the overlaying polyethylene film, without disruption of the wet coating. The over-laying polyethylene film can be made thinner than 0.02 mm., thus decreasing drying time. The cost of the necessary low density polyethylene film is a negligibly small fraction of the price of the tape as a whole.

The pre-drying time, if used, should be as long as possible since the application of the polyethylene film slows down the drying process. The pre-drying must not be carried to the extent, however, that the coating becomes relatively non-deformable. It is necessary that the coating remains plastic and easily deformable when the polyethylene film is applied so that it can readily mold the surface flat during drying. Application of the polyethylene film as soon as practicable has the additional advantage that the wet coating is shielded from stray dust for a longer period of time and when it is most susceptible to contamination. A balance must thus be struck between ease of application of the polyethylene film and possibility of contamination, which can readily be determined when a particular production environment is known. It is important that the polyethylene film is kept on the coating until the drying is reasonably complete. Although the film can be removed without deforming or disrupting the wet film in any way, the coating will dry with a rather dull appearance similar to that found on tape made without the overlay of polyethylene. The proper drying time, during which the film is to remain on the coating can again be determined by a few experiments, given the production conditions and temperature and air circulation by observing and testing the surface upon removal of the film. There is a certain point of dryness at which the polyethylene film can be removed at which maximum gloss is obtained. Removal of the film prior to that time and subsequent drying will result in mat looking film, while leaving the film on the coating for a longer period of time extends the overall drying time.

The present invention has been described in detail in particular with respect to a manufacture of high quality magnetic recording tape which has a high gloss surface, essentially free from protuberances and smooth to reduce wear on transducer heads. It is, however, equally applicable where it is desired to coat a substrate with another material, in a wet dispersion, to result in a smooth coated article. To permit easy stripping off of the overlying coating film, the film must be of a substance which permits evaporation of the solvent therethrough while, at the same time, having at least a surface which is non-adhesive with respect to the applied coating.

I claim:

1. Method of manufacturing high quality magnetic recording tape having a smooth coated surface comprising: depositing a coating of a wet dispersion of magnetic particles and a binder, in a solvent, on a substrate of a material which is impervious to the solvent; covering said dispersion, on the substrate, by a film of material having a high permeability to the solvent; evaporating said solvent while covered by said film of material through the solvent permeable film; and stripping said film of material off the dried magnetic particle binder on the substrate.

2. Method of manufacturing high quality magnetic recording tape having a smooth coated surface comprising: depositing a coating of a wet dispersion of iron oxide particles and a binder, in a solvent, on a substrate of a material which is impervious to the solvent; covering said dispersion, on the substrate, by a film of material having a high permeability to the solvent; evaporating said solvent while covered by said film of material through the solvent permeable film; and stripping said film of material off the dried iron oxide binder on the substrate.

3. Method according to claim 2, including the step of permitting some of the solvent to evaporate after depositing of the dispersion, and before application of the film of material, to pre-dry said dispersion.

4. Method according to claim 3, wherein the pre-drying step includes a drying time at about 21° C. and of about 30 seconds.

5. Method according to claim 3, wherein the pre-drying step is carried out for a period of time less than that during which the coating becomes non-deformable.

6. Method according to claim 2, wherein the film of material is a thin flexible plastic film.

7. Method according to claim 6, wherein the film of material is polyethylene.

8. Method according to claim 6, wherein the film of material has a thickness of about 0.02 mm., or less.

9. Method according to claim 2, wherein the solvent evaporating step includes a drying time at about 21° C. of about 45 minutes.

10. Method according to claim 6, wherein the evaporation step, with the covering of the polyethylene film applied, is carried out incompletely; and the film is stripped off the iron oxide-binder coating while the coating still contains solvent, but after the surface of the coating is no longer wet.

11. Method according to claim 2, wherein the coating of the wet dispersion, when applied to the substrate has a thickness of about 0.05 mm.

12. Method according to claim 2, wherein said film has at least a surface which is non-adhesive with respect to the coating.

13. Method according to claim 2, wherein said film is non-adhesive with respect to the coating, and has the characteristic to be able to be stripped cleanly off the coating.

14. Method according to claim 2, wherein the substrate is a tape of polyester film.

15. Method according to claim 2, wherein the solvent is a non-aqueous solvent system.

16. Method according to claim 2, wherein the solvent is a non-aqueous solvent system and the film of material is a polyethylene film of a thickness of about 0.02 mm., or less.

17. Method according to claim 2, wherein the solvent is a non-aqueous solvent and the film is permeable to non-aqueous solvents only.

References Cited

UNITED STATES PATENTS

| | | | |
|---|---|---|---|
| 3,157,528 | 11/1964 | Strahl | 117—64 |
| 3,192,893 | 7/1965 | Bauer et al. | 117—64 X |
| 3,296,014 | 1/1967 | Williams | 117—65.2 X |
| 2,628,929 | 2/1953 | Persoon et al. | 117—235 X |
| 3,281,267 | 10/1966 | Rice | 117—64 X |
| 2,688,567 | 9/1954 | Franck | 117—237 |
| 3,110,612 | 11/1963 | Gottwald et al. | 117—119.6 X |
| 2,956,310 | 10/1960 | Roop et al. | 264—216 X |
| 3,152,203 | 10/1964 | Dumitru | 264—212 |
| 2,586,587 | 2/1952 | Wendt | 117—122 UX |
| 3,497,411 | 2/1970 | Chebiniak | 117—3.2 X |

OTHER REFERENCES

#7410, Smoother Surface for Poured Concrete, page 7410.

WILLIAM D. MARTIN, Primary Examiner
B. D. PIANALTO, Assistant Examiner

U.S. Cl. X.R.

117—64 R, 5.1, 235, 239; 264—86, 212, 216